United States Patent [19]
Hakkenberg et al.

[11] 4,150,856
[45] Apr. 24, 1979

[54] ONE-PIECE TRACK PIN

[75] Inventors: Peter Hakkenberg, Dunlap; Richard E. Livesay, Peoria, both of Ill.

[73] Assignee: Caterpillar Tractor Co., Peoria, Ill.

[21] Appl. No.: 854,852

[22] Filed: Nov. 25, 1977

[51] Int. Cl.² .......................................... B62D 55/20
[52] U.S. Cl. ..................................... 305/11; 305/14; 305/58 R
[58] Field of Search ................... 305/11, 14, 58 R, 59

[56] References Cited
U.S. PATENT DOCUMENTS

| | | | |
|---|---|---|---|
| 1,298,597 | 3/1919 | Strait | 305/11 |
| 1,971,553 | 8/1934 | Fisk | 198/195 |
| 2,517,429 | 8/1950 | Henning | 305/10 |
| 2,647,023 | 7/1953 | Kubaugh | 305/10 |
| 3,050,346 | 8/1962 | Simpson et al. | 305/11 |
| 3,409,336 | 11/1968 | Dadds | 305/11 |
| 3,492,054 | 1/1970 | Boggs et al. | 305/11 |
| 3,540,302 | 11/1976 | Bendall | 74/253 |
| 3,958,836 | 5/1976 | Brown | 305/14 |

FOREIGN PATENT DOCUMENTS 1362146 4/1964 France ...................................... 305/58

*Primary Examiner*—John P. Shannon
*Attorney, Agent, or Firm*—Phillips, Moore, Weissenberger, Lempio & Majestic

[57] ABSTRACT

An endless track assembly for a track-type vehicle comprises an articulated chain for pivotally connecting each pair of adjacent track shoes together. Each articulated joint of the chain comprises a one-piece pin having a pair of laterally spaced pin portions and a bushing portion disposed intermediate the pin portions. A pair of first links are secured to the pin portions and a pair of second links are pivotally mounted on the pin portions. An annular seal is disposed between each adjacent pair of first and second links and a snap ring is secured to an outer end of each of the pin portions to prevent axial displacement of the links. A cavity is defined in the pin to communicate lubricant to the pivotal connections of the second links on the pin and end caps are secured on the ends of the pin to close the cavity and to cover the snap rings.

7 Claims, 1 Drawing Figure

4,150,856 though the pin is preferably constructed as one-piece, it should be understood that the bushing portion could constitute a separate cylindrical member suitably mounted on a single elongated pin or a pair of axially aligned bushing members.

ONE-PIECE TRACK PIN

BACKGROUND OF THE INVENTION

This invention relates to an articulated joint adapted for use in a chain for the track assembly of a track-type vehicle.

A conventional joint of this type comprises a pin having a first pair of links secured on either end thereof, a sprocket-engaging bushing mounted on the pin and a second pair of links secured on the bushing. The links are secured in pressfit relationship on the pin and bushing and are subjected to high stresses in the vicinities of the mounting bores formed therethrough. Since the bores formed through the first pair of links necessarily have larger diameters formed therethrough, the stress problem is of particular concern thereat.

In order to service track assembly, such as the replacement of annular seals disposed between each pair of first and second links, a standard master link is released and the chain formed by the links is transported to a remote servicing area, minus the uncoupled track shoes. Such procedure results in substantial "down time" of the vheicle and a resulting economic loss to the operator thereof. Servicing of the chain normally requires a hydraulic press to disconnect the outer links from the pin.

Upon completion of such servicing, such as the replacement of the seals, the links, pin and bushing must be reassembled in their correct order to fully protect the seals. The articulated chain is then shipped back to the job site and the track assembly is reinstalled on the vehicle with the track shoes secured thereon. The above procedure is not only time-consuming and uneconomical, but also subjects the component parts of the chain to potential damage upon transport thereof between the job site and the servicing area.

SUMMARY OF THIS INVENTION

The present invention is directed to overcoming one or more of the problems as set forth above.

In particular, the improved articulated joint of this invention exhibits substantially less stress concentrations than the afore-described, conventional articulated joint, exhibits a high degree of structural integrity and is adapted to be assembled and serviced expeditiously and economically. The articulated joint comprises a pin means, including a pair of laterally spaced pin portions and a bushing portion disposed intermediate the pin portions. A pair of laterally spaced first links are each secured to a respective one of the pin portions and a pair of laterally spaced second links are pivotally mounted on the pin portions. A retaining means is provided on each end of the pin means for preventing relative axial outward movement of the links. A cavity is defined in the pin to communicate lubricant to the pivotal connections of the second links and end caps are secured on the ends of the pin to close the cavity and to protectively cover the retaining means.

BRIEF DESCRIPTION OF THE DRAWINGS

Other objects of this invention will become apparent from the following description and accompanying drawing which is a longitudinal sectional view of an articulated joint embodying this invention.

DETAILED DESCRIPTION

Figure 1:
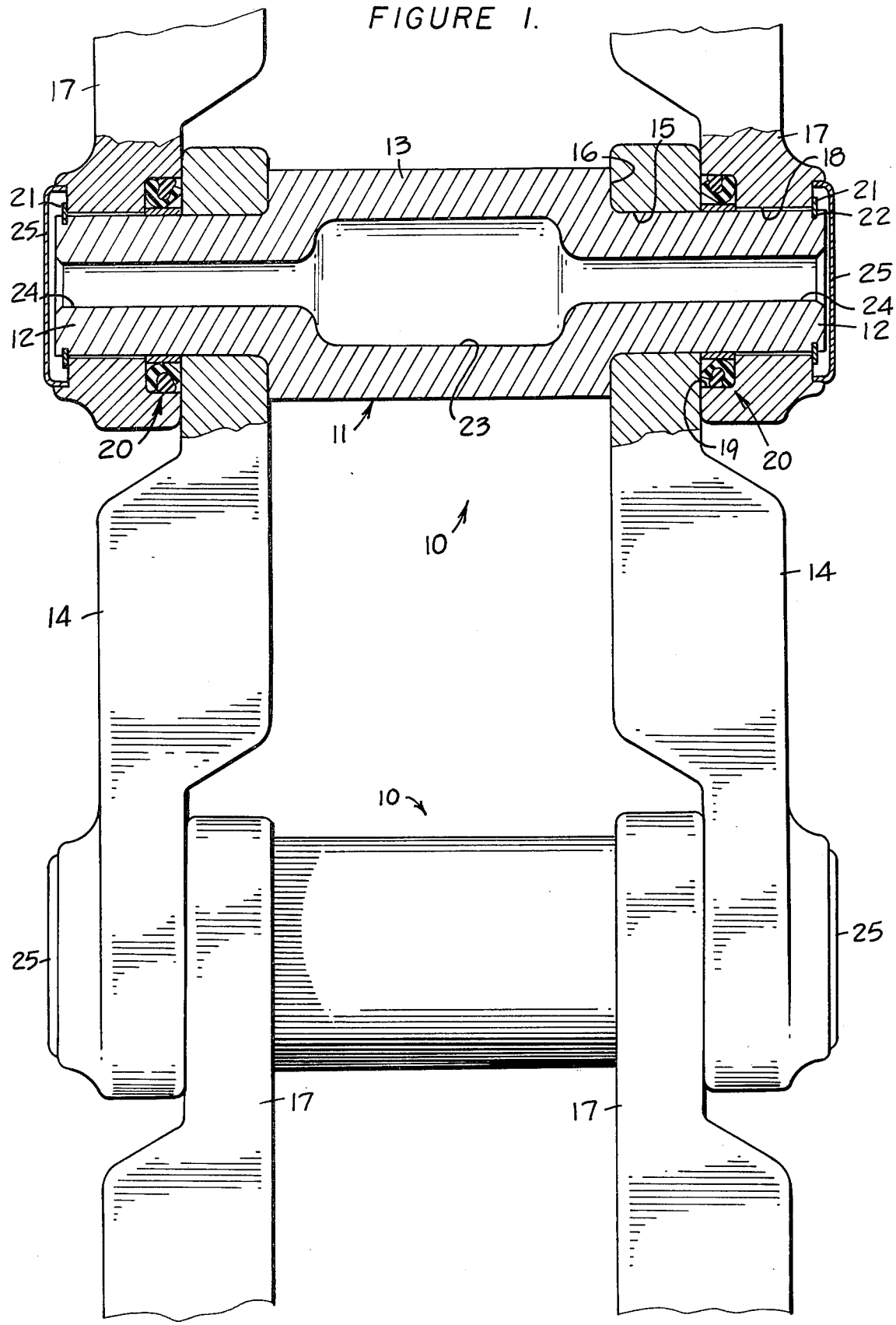

FIG. 1 illustrates an articulated joint 10 comprising a cylindrical one-piece pin or pin means 11. The pin comprises a pair of laterally spaced and at least approximately uniform pin portions 12 and a bushing portion 13 disposed intermediate the pin portions and having an outside diameter substantially larger than that of the pin portions. Although the pin is preferably constructed as one-piece, it should be understood that the bushing portion could constitute a separate cylindrical member suitably mounted on a single elongated pin or a pair of axially aligned bushing members.

First ends of a pair of laterally spaced first links 14 each has a mounting bore 15 formed therethrough which is press-fitted or otherwise suitably secured on a respective pin portion 12. Each link abuts an annular shoulder 16 of bushing portion 13 in bearing contact therewith. Second ends of a pair of laterally spaced second links 17, identical in construction to links 14 and disposed outboard of the first ends thereof, each has a mounting bore 18 formed therethrough which may have an inside diameter only slightly larger than the inside diameter of bore 15. If so desired, the outer end of pin portion 12 underlying each link 17 may have a stepped-down diameter (e.g., 0.010 in. less than the inner end of the pin portion) to facilitate the press-fitting of link 14 onto the pin portion. The second ends of links 17 are thus pivotally mounted in slip-fit relationship on pin portions 12 whereas the first ends of links 14 and secured to pin 11. As an alternative to forming pin portions 12 with at least approximately uniform outside diameters, bores 15 and 18 could be sized equally and the outer end of pin portion 12 could have a stepped-down diameter to accommodate the pivotal mounting of link 17 thereon. As suggested above, such a stepped-down diameter would also avoid having to press-fit link 14 over the full axial length of the pin portion.

Each link 17 defines an annular counterbore 19 therein which retains an annular sealing means 20 for effecting a seal between each adjacent pair of first and second links. It should be noted in the drawing that the links are bent whereby the illustrated and non-sectioned adjacent articulated joint will find the second ends of first links 14 disposed outboard of the first ends of the next adjacent pair of second links 17 and pivotally mounted on respective pin portions 12. In the latter joint, the first ends of said links 17 will thus be pressfitted onto such pin portions.

A retaining means, preferably in the form of an annular snap-ring 21, is disposed in an annular groove 22 formed in a respective pin portion 12 and abuts an outer end of a respective link 17. The snap ring thus prevents axial outward movement of the link relative to pin 11. An enlarged lubricant-retaining cavity 23 is defined in pin 11 and communicates with a pair of passages 24 adapted to communicate lubricant to snap ring 21 and thence to the slight annular clearance defined between each link 17 and pin portion 12. An end cap 25 is secured on the end of each link 17 to prevent the egress of lubricant thereby an the ingress of dirt into the joint.

From the above description it can be seen that articulated joint 10 of this invention reduces the size of bores 15 and, formed through the first ends of links 14 and 17 to approximately the size of slightly oversized bores 18, formed through the second ends of the links to thus reduce the overall size and weight of the links over conventional ones. Thus, additional wear material could be formed on the links to substantially increase the wear capabilities thereof. In addition, a substantially large lubricant-retaining cavity 23 may be formed in pin 11, particularly when formed as one-piece, to further increase weight savings and to substantially increase the lubricant-containing capacity of the articulated joint.

The overall reduced weight of the track assembly not only provides savings of raw materials to lower costs, but also aids in reducing the horsepower required to drive the vehicle. Furthermore, the track pin of this invention may be constructed as one-piece and is adapted for use in otherwise conventional track assemblies. In such a one-piece construction, wherein the wall thickness of bushing portion 13 is substantial, the turn interval thereof may be extended substantially over conventional bushings. As suggested above, although the pin is preferably constructed as one-piece, the broader aspects of this invention contemplate employing a separate pin and a separate bushing (or a pair of bushing members) mounted thereon. Since only links 14 are press-fit on pin 11, assembly and disassembly of the articulated joint for servicing purposes is obviously facilitated over conventional ones.

The embodiments of the invention in which an exclusive property or privilege is claimed are defined as follows:

1. An articulated joint adapted for use in a track assembly for a track-type vehicle comprising
    a one-piece pin means including a pair of laterally spaced cylindrical pin portions and a cylindrical bushing portion disposed intermediate said pin portions and having an outside diameter substantially larger than the outside diameters of said pin portions,
    a pair of laterally spaced first links each secured to a respective pin portion of said pin means,
    a pair of laterally spaced second links each pivotally mounted on a respective one of said pin portions,
    retaining means for preventing axial outward movement of said second links relative to said pin means,
    annular sealing means disposed between each adjacent pair of said first and second links and further disposed solely in an annular counterbore defined in each of said second links for engaging a respective one of said first links in sealing contact therewith,
    means defining a lubricant-retaining cavity in said pin means and passage means communicating said cavity with a pivotal connection between each of said second links and a respective one of said pin portions,
    an end cap secured to an outer end of each of said second links for closing said passage means for preventing egress of lubricant thereby and ingress of dirt into said joint, and
    a retaining means positioned on each end of said pin means for preventing axial movement of said pin means relative to said second links and fully covered by said end cap to protect and prevent dislodgement of said retaining means.

2. The articulated joint of claim 1 wherein a first end of each of said first links is secured on a respective one of said pin portions.

3. The articulated joint of claim 2 wherein each of said pin portions is at least approximately uniform and means defining bores through said first and second links, mounting said links on said pin portions, and wherein the bores formed through said first and second links are at least approximately uniform.

4. The articulated joint of claim 3 wherein the bore formed through each of said first links is disposed in press-fit relationship on a respective one of said pin portions and wherein the bore formed through each of said second links is disposed in slip-fit and pivotal relationship on such pin portion.

5. The articulated joint of claim 1 wherein said bushing portion defines an annular shoulder on either end thereof and wherein each of said first links abuts a said shoulder in bearing contact therewith.

6. The articulated joint of claim 1 wherein said first and second links have at least substantially identical constructions.

7. The articulated joint of claim 1 wherein said retaining means comprises a snap ring mounted on each end of said pin means to abut a respective one of said second links.

* * * * *